(12) United States Patent
Yoda et al.

(10) Patent No.: US 7,674,841 B2
(45) Date of Patent: Mar. 9, 2010

(54) ADDITIVE FOR PRINTING INK, SOLVENT DISPERSION FOR PRINTING INK, AND PRINTING INK

(75) Inventors: Masaki Yoda, Sagamihara (JP); Hideo Toyoda, Minato-ku (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 413 days.

(21) Appl. No.: 10/573,840

(22) PCT Filed: Jul. 22, 2004

(86) PCT No.: PCT/JP2004/010784

§ 371 (c)(1),
(2), (4) Date: Mar. 29, 2006

(87) PCT Pub. No.: WO2005/030889

PCT Pub. Date: Apr. 7, 2005

(65) Prior Publication Data

US 2007/0060669 A1  Mar. 15, 2007

(30) Foreign Application Priority Data

Sep. 29, 2003 (JP) .............................. 2003-337535

(51) Int. Cl.
*C09D 11/12* (2006.01)
(52) U.S. Cl. ..................... 523/160; 523/161; 106/31.13; 526/160
(58) Field of Classification Search .............. 106/31.13, 106/218; 523/160; 524/366; 347/1, 54, 347/56, 68, 73, 100, 112
See application file for complete search history.

(56) References Cited

U.S. PATENT DOCUMENTS

| 3,892,717 A | * | 7/1975 | Mori et al. ................... 525/285 |
| 6,761,764 B2 | * | 7/2004 | Krendlinger et al. ........ 106/502 |
| 6,858,765 B2 | * | 2/2005 | Toyoda .......................... 585/9 |
| 6,860,929 B2 | | 3/2005 | Mihan et al. |
| 2006/0009542 A1 | | 1/2006 | Schmalzl et al. |

FOREIGN PATENT DOCUMENTS

| JP | 04-268307 A | | 9/1992 |
| JP | 11-080252 A | | 3/1999 |
| JP | 2003-183453 A | | 7/2003 |
| JP | 2003-201436 A | | 7/2003 |
| JP | 2003183453 A | * | 7/2003 |
| WO | 01/64799 A | | 9/2001 |
| WO | WO-0190262 A2 | * | 11/2001 |
| WO | 01/98416 A | | 12/2001 |

* cited by examiner

*Primary Examiner*—David Wu
*Assistant Examiner*—Vu Nguyen
(74) *Attorney, Agent, or Firm*—Buchanan Ingersoll & Rooney PC

(57) ABSTRACT

An additive for a printing ink comprising a wax of either an ethylene homopolymer or ethylene.$C_{3\text{-}20}$ α-olefin copolymer each has an intrinsic viscosity, weight-average molecular weight/number-average molecular weight ratio, z-average molecular weight/weight-average molecular weight ratio, density, penetration hardness, and acid value in specific ranges; a solvent dispersion obtained by dispersing the wax; and a printing ink containing the wax.

3 Claims, No Drawings

ADDITIVE FOR PRINTING INK, SOLVENT DISPERSION FOR PRINTING INK, AND PRINTING INK

TECHNICAL FIELD

The present invention relates to an additive for a printing ink. More particularly, the present invention relates to an additive for a printing ink comprising a specific polyethylene-based wax, a solvent dispersion for a printing ink comprising the wax dispersed in a non-aromatic solvent, and a printing ink containing the wax and not containing an aromatic solvent.

BACKGROUND ART

In the printing industry where a large amount of organic solvents is used, there has been growing concern about labor and safety, for example, a measure of hydrocarbon emission control regulations in local community, Fire Protection Law and Industrial Safety and Health Law amendment which have recently been enforced in succession. In particular, an aromatic hydrocarbon-based solvent such as benzene, toluene, xylene and the like, which has been preferably used up to now from the aspect of solubility, drying characteristics and the like, is evaporated and diffused into the atmosphere, and is a causative substance which forms an oxidant under photochemical reactions, and therefore strict legal restrictions are imposed on the use the solvent. From these issues, there is an increasing demand for a printing ink with reduced content of an aromatic hydrocarbon solvent. Currently, examples of a non-aromatic solvent, which are being used or which use is considered for a printing ink, include an ester-based solvent such as methyl acetate, ethyl acetate, n-propyl acetate, isopropyl acetate and the like, a ketone-based solvent such as acetone, methylethylketone and the like, and an alcohol-based solvent such as methanol, ethanol, n-propyl alcohol, isopropyl alcohol and the like.

With respect to a conventional printing ink, resistance to wear, abrasion and scratch of printed products is improved by wax. As such a wax, a polyethylene-based wax is particularly preferable.

Conventionally, in printing ink applications, a polyethylene-based wax has been primarily used in the form of a dispersion or paste prepared by a crystallization method. However, the non-aromatic solvents described above are poor solvents, making it extremely difficult for them to deal with the polyethylene-based wax in these forms. Moreover, a dispersion produced using a wet ball mill and the like has a drawback in that it lacks storage stability because the affinity of the polyethylene-based wax for the above-mentioned non-aromatic solvents is low, and therefore the polyethylene-based wax and the solvent are liable to separate in the dispersion or in the printing ink in which these solvents are used. Furthermore, although the polyethylene-based wax is sometimes used in the form of a fine powder, it is liable to precipitate in the above-mentioned non-aromatic solvents, and likewise it lacks the storage stability of the printing ink in which these solvents are used.

DISCLOSURE OF THE INVENTION

The subject of the present invention is to provide a printing ink which contains no aromatic solvents and has simultaneously improved abrasion resistance and blocking resistance.

In addition, the present invention is to provide an additive comprising a polyethylene-based wax which can simultaneously improve abrasion resistance and blocking resistance of a printing ink and is stably dispersed in a non-aromatic solvent, and a solvent dispersion which can simultaneously improve abrasion resistance and blocking resistance of a printing ink and in which the polyethylene-based wax is stably dispersed in a non-aromatic solvent.

After devoted study, the present inventors have discovered that a specific polyethylene-based wax modified by oxidation is stably dispersed in a non-aromatic solvent, and have accomplished the present invention.

Namely, the present invention is an additive for a printing ink comprising a polyethylene-based wax specified by the following (i) to (vii):

(i) being an ethylene homopolymer or a copolymer of ethylene and at least one α-olefin selected from α-olefins having 3 to 20 carbon atoms, (ii) having the intrinsic viscosity [η] measured in decalin at 135° C. ranging from 0.06 to 0.35 dl/g, (iii) having the ratio (Mw/Mn) of weight average molecular weight (Mw) to number average molecular weight (Mn) measured by gel permeation chromatography (GPC) ranging from 1.7 to 3.2, (iv) having the ratio (Mz/Mw) of z-average molecular weight (Mz) to weight average molecular weight (Mw) measured by gel permeation chromatography (GPC) ranging from 1.5 to 2.0, (v) having the density ranging from 920 to 980 kg/m$^3$, (vi) having the penetration hardness of 5 dmm or less, and (vii) having the acid value ranging from 0.3 to 9.9 KOH-mg/g.

Also, the present invention is a solvent dispersion in which the polyethylene-based wax in the form of a fine powder having a volume average diameter in a range from 0.3 to 10 μm is dispersed in a non-aromatic solvent at a ratio of 5 to 50 wt. %, and a printing ink containing the polyethylene-based wax.

The additive for a printing ink comprising a specific polyethylene-based wax of the present invention can simultaneously improve abrasion resistance and blocking resistance of the printing ink and is stably dispersed in a non-aromatic solvent.

Moreover, the solvent dispersion of the present invention has good storage stability because the polyethylene-based wax is stably dispersed in the non-aromatic solvent, and also can simultaneously improve abrasion resistance and blocking resistance of the printing ink.

Therefore, according to the present invention, there is provided a printing ink having simultaneously improved abrasion resistance and blocking resistance and containing no or almost no aromatic solvents.

BEST MODE FOR CARRYING OUT THE INVENTION

Hereinafter, a polyethylene-based wax used in the present invention will be explained in detail.

The polyethylene-based wax used in the present invention is an ethylene homopolymer or a copolymer of ethylene and at least one α-olefin selected from α-olefins having 3 to 20 carbon atoms, among which an ethylene.α-olefin copolymer is preferable. Here, an α-olefin preferably is an α-olefin having 3 to 10 carbon atoms, more preferably an α-olefin having 3 to 8 carbon atoms, and especially preferably propylene, 1-butene, 1-hexene or 4-methyl-1-pentene.

Moreover, the polyethylene-based wax used in the present invention has an intrinsic viscosity [η] measured in decalin at 135° C. ranging from 0.06 to 0.35 dl/g, preferably from 0.10 to 0.20 dl/g. When the intrinsic viscosity falls within the above-mentioned range, the polyethylene-based wax has an appropriate strength, exhibiting excellent abrasion resistance and blocking resistance as a wax for a printing ink. Also it is readily processed to a fine powder form.

Furthermore, the polyethylene-based wax used in the present invention has a ratio (Mw/Mn) of weight average molecular weight (Mw) to number average molecular weight (Mn) measured by gel permeation chromatography (GPC) ranging from 1.7 to 3.2, and a ratio (Mz/Mw) of z-average molecular weight (Mz) to weight average molecular weight (Mw) measured by gel permeation chromatography (GPC) ranging from 1.5 to 2.0. When Mw/Mn and Mz/Mw of the polyethylene-based wax fall within these ranges, the polyethylene-based wax exhibits excellent abrasion resistance and blocking resistance as a wax for a printing ink.

Moreover, the penetration hardness of the polyethylene-based wax used in the present invention (measured by JIS K2207) is 5 dmm or less, preferably 3 dmm or less. If the penetration hardness is 5 dmm or less, the polyethylene-based wax has an appropriate strength, exhibiting excellent abrasion resistance and blocking resistance as a wax for a printing ink.

Furthermore, the polyethylene-based wax used in the present invention has a density measured by a density gradient tube method ranging from 920 to 980 kg/m$^3$, preferably from 930 to 960 kg/m$^3$. When the density falls within the above range, the polyethylene-based wax has an appropriate strength, exhibiting excellent abrasion resistance and blocking resistance as a wax for a printing ink.

Additionally, the polyethylene-based wax used in the present invention has an acid value, and the acid value ranges from 0.3 to 9.9 KOH-mg/g, preferably from 0.5 to 5.0 KOH-mg/g. When the acid value falls within the above range, the polyethylene-based wax exhibits a good dispersibility in a polar solvent. In addition, when the acid value is more than 9.9 KOH-mg/g, the polyethylene-based wax has a reduced strength and exhibits no sufficient abrasion resistance and blocking resistance, and when the acid value is less than 0.3 KOH-mg/g, the polyethylene-based wax has a poor dispersibility in a polar solvent.

The polyethylene-based wax having the above-mentioned acid value can be obtained by oxidizing a polyethylene-based wax produced with a Ziegler-based catalyst, a metallocene-based catalyst or the like in accordance with a known method (for example, Japanese Patent Laid-Open Publication No. 80252/1999).

Production examples of the polyethylene-based wax used in the present invention will be explained hereinafter, but not limited to these. For example, the polyethylene-based wax is produced by using the following metallocene-based catalyst comprising a metallocene compound of a transition metal selected from Group IV elements in the periodic table and an organoaluminum oxy-compound and/or an ionized ionic compound.

(Metallocene Compounds)

A metallocene compound forming a metallocene-based catalyst is a metallocene compound of a transition metal selected from Group IV elements in the periodic table, and specific examples include a compound represented by the following general formula (1),

(1)

wherein, $M^1$ is a transition metal selected from Group IV elements in the periodic table, x is the valence of the transition metal $M^1$ and L is a ligand. Examples of the transition metal represented by $M^1$ include zirconium, titanium, hafnium and the like. L is a ligand coordinating to the transition metal $M^1$, of which at least one ligand L is a ligand having a cyclopentadienyl skeleton, and the ligand having a cyclopentadienyl skeleton may have a substituent. Examples of the ligand L having a cyclopentadienyl skeleton include alkyl- or cycloalkyl-substituted cyclopentadienyl group such as cyclopentadienyl group, methylcyclopentadienyl group, ethylcyclopentadienyl group, n- or i-propylcyclopentadienyl group, n-, i-, sec- or t-butylcyclopentadienyl group, dimethylcyclopentadienyl group, methylpropylcyclopentadienyl group, methylbutylcyclopentadienyl group, methylbenzylcyclopentadienyl group and the like; and indenyl group, 4,5,6,7-tetrahydroindenyl group, fluorenyl group and the like. Hydrogen atoms of the ligand having a cyclopentadienyl skeleton may be substituted with a halogen atom or a trialkylsilyl group.

When the metallocene compound described above has two or more ligands having a cyclopentadienyl skeleton as the ligand L, two of the ligands having the cyclopentadienyl skeleton may be bonded together via an alkylene group such as ethylene, propylene and the like; a substituted alkylene group such as isopropylidene, diphenylmethylene and the like; a silylene group, a substituted silylene group such as dimethylsilylene group, diphenylsilylene group, methylphenylsilylene group and the like.

Examples of a ligand L other than a ligand having a cyclopentadienyl skeleton (a ligand not having a cyclopentadienyl skeleton) include a hydrocarbon group having 1 to 12 carbon atoms, an alkoxy group, an aryloxy group, a sulfonic aid-containing group ($-SO_3R^1$), a halogen atom or a hydrogen atom (wherein, $R^1$ is an alkyl group, an alkyl group substituted with a halogen atom, an aryl group, an aryl group substituted with a halogen atom or an aryl group substituted with an alkyl group).

EXAMPLE 1 OF THE METALLOCENE COMPOUND

For example, when the valence of a transition metal is 4, a metallocene compound represented by the general formula (1) is more specifically represented by the following general formula (2),

(2)

wherein, $M^1$ is a transition metal selected from Group IV elements in the periodic table, $R^2$ is a group (a ligand) having a cyclopentadienyl skeleton, $R^3$, $R^4$ and $R^5$ represent each independently a group (a ligand) having or not having a cyclopentadienyl skeleton. k is an integer of 1 or larger, and k+l+m+n=4.

Examples of the metallocene compound in which $M^1$ is zirconium and having at least two ligands having each a cyclopentadienyl skeleton include bis(cyclopentadienyl)zirconium monochloridemonohydride, bis(cyclopentadienyl)zirconiumdichloride, bis(1-methyl-3-butylcyclopentadienyl)zirconiumbis(trifluoromethanesulfonate), bis(1,3-dimethylcyclopentadienyl)zirconiumdichloride and the like.

Among the compounds described above, a compound in which a 1,3-position substituted cyclopentadienyl group is replaced by a 1,2-position substituted cyclopentadienyl group may be used.

Moreover, as other examples of a metallocene compound, there may be used a bridge type metallocene compound of the above formula (2), wherein at least two of $R^2$, $R^3$, $R^4$ and $R^5$, for example, $R^2$ and $R^3$ are groups (ligands) each having a cyclopentadienyl skeleton and at least two of the groups are bonded via an alkylene group, substituted alkylene group, silylene group, substituted silylene group and the like. In this case, $R^4$ and $R^5$ are each independently similar to ligand L other than the ligand having a cyclopentadienyl skeleton described above.

Examples of the bridge type metallocene compound include ethylenebis(indenyl)dimethylzirconium, ethylenebis (indenyl)zirconiumdichloride, isopropylidene(cyclopentadi-enyl-fluorenyl)zirconiumdichloride, diphenylsilylenebis(in-denyl)zirconiumdichloride, methylphenylsilylenebis (indenyl)zirconium dichloride and the like.

EXAMPLE 2 OF THE METALLOCENE COMPOUND

In addition, a metallocene compound is exemplified by a compound represented by the following general formula (3), which is described in Japanese Patent Laid-Open Publication No. 268307/1992,

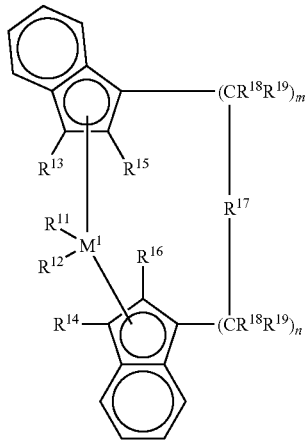

(3)

wherein, $M^1$ is a transition metal of Group IV elements in the periodic table, specifically titanium, zirconium and hafnium.

$R^{11}$ and $R^{12}$ may be the same or different from each other, and are a hydrogen atom; an alkyl group having 1 to 10 carbon atoms; an alkoxy group having 1 to 10 carbon atoms; an aryl group having 6 to 10 carbon atoms; an aryloxy group having 6 to 10 carbon atoms; an alkenyl group having 2 to 10 carbon atoms; an arylalkyl group having 7 to 40 carbon atoms; an alkylaryl group having 7 to 40 carbon atoms; an arylalkenyl group having 8 to 40 carbon atoms; or a halogen atom, and $R^{11}$ and $R^{12}$ preferably are a chlorine atom.

$R^{13}$ and $R^{14}$ may be the same or different from each other, and are a hydrogen atom; a halogen atom; an optionally halogenated alkyl group having 1 to 10 carbon atoms; an aryl group having 6 to 10 carbon atoms; $-N(R^{20})_2$, $-SR^{20}$, $-OSi(R^{20})_3$, $-Si(R^{20})_3$ or $-P(R^{20})_2$, wherein $R^{20}$ is a halogen atom, preferably a chlorine atom; an alkyl group having 1 to 10 carbon atoms, preferably 1 to 3 carbon atoms; or an aryl group having 6 to 10 carbon atoms, preferably 6 to 8 carbon atoms, and $R^{13}$ and $R^{14}$ are especially favorably a hydrogen atom.

$R^{15}$ and $R^{16}$ are the same as $R^{13}$ and $R^{14}$ except that a hydrogen atom is not contained, and may be the same or different from each other, preferably are same. $R^{15}$ and $R^{16}$ preferably are an optionally halogenated alkyl group having 1 to 4 carbon atoms, and specifically include methyl, ethyl, propyl, isopropyl, butyl, isobutyl, trifluoromethyl and the like, and especially preferable is methyl.

In the general formula (3) described above, $R^{17}$ is selected from the following group;

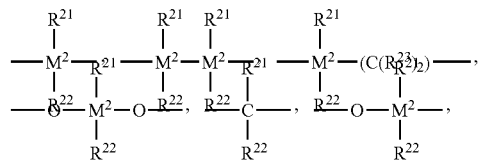

$=BR^{21}$, $=AlR^{21}$—Ge—, —Sn—, —O—, —S—, $=SO$, $=SO_2$, $=NR^{21}$, $=CO$, $=PR^{21}$, $=P(O)R^{21}$ and the like. $M^2$ is silicon, germanium or tin, preferably silicon or germanium. Here, $R^{21}$, $R^{22}$ and $R^{23}$ may be the same or different from one another, and are a hydrogen atom; a halogen atom; an alkyl group having 1 to 10 carbon atoms; a fluoroalkyl group having 1 to 10 carbon atoms; an aryl group having 6 to 10 carbon atoms; a fluoroaryl group having 6 to 10 carbon atoms; an alkoxy group having 1 to 10 carbon atoms; an alkenyl group having 2 to 10 carbon atoms; an arylalkyl group having 7 to 40 carbon atoms; an arylalkenyl group having 8 to 40 carbon atoms; or an alkylaryl group having 7 to 40 carbon atoms. "$R^{21}$ and $R^{22}$" or "$R^{21}$ and $R^{23}$" may form a ring together with an atom to which they are each bonded. Further, $R^{17}$ preferably is $=CR^{21}R^{22}$, $=SiR^{21}R^{22}$, $=GeR^{21}R^{22}$, —O—, —S—, $=SO$, $=PR^{21}$ or $=P(O)R^{21}$. $R^{18}$ and $R^{19}$ may be the same or different from each other and include the same groups as $R^{21}$. m and n may be the same or different from each other and are 0, 1 or 2, preferably 0 or 1, and m+n is 0, 1 or 2, preferably 0 or 1.

Examples of the metallocene compound represented by the general formula (3) described above include rac-ethylene(2-methyl-1-indenyl)$_2$-zirconium-dichloride, rac-dimethylsi-lylene(2-methyl-1-indenyl)$_2$-zirconium-dichloride and the like. These metallocene compounds can be produced by a method described in Japanese Patent Laid-Open Publication No. 268307/1992.

EXAMPLE 3 OF THE METALLOCENE COMPOUND

Furthermore, a compound represented by the following general formula (4) may be used as the metallocene compound (4)

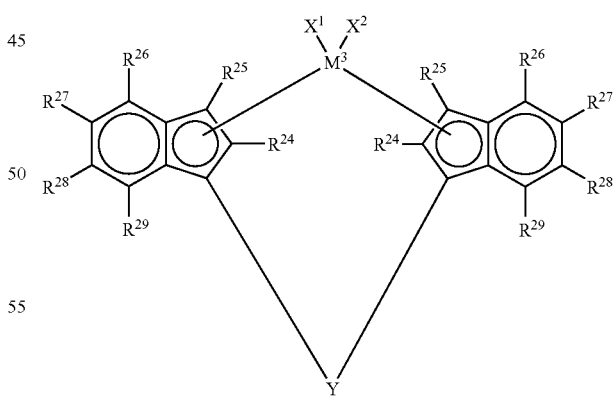

In the formula (4), $M^3$ represents a transition metal of Group IV elements in the periodic table, specifically titanium, zirconium, hafnium and the like. $R^{24}$ and $R^{25}$ may be the same or different from each other and represent a hydrogen atom, a halogen atom, a hydrocarbon group having 1 to 20 carbon atoms, a halogenated hydrocarbon group having 1 to 20 carbon atoms, a silicon-containing group, an oxygen-containing group, a sulfur-containing group, a nitrogen-containing group or a phosphorus-containing group. $R^{24}$ preferably is a hydrocarbon group, and especially preferably is an alkyl group having 1 to 3 hydrocarbons of methyl, ethyl or propyl. $R^{25}$ preferably is a hydrogen atom or a hydrocarbon group, and especially preferably is a hydrogen atom and an alkyl group having 1 to 3 carbon atoms of methyl, ethyl or propyl. $R^{26}$, $R^{27}$, $R^{28}$ and $R^{29}$ may be the same or different from each other and represent a hydrogen atom, a halogen atom, a hydrocarbon group having 1 to 20 carbon atoms or a halogenated hydrocarbon group having 1 to 20 carbon atoms. Among these, a hydrogen atom, a hydrocarbon group or a halogenated hydrocarbon group is preferable. At least one pair of $R^{26}$ and $R^{27}$, $R^{27}$ and $R^{28}$, and $R^{28}$ and $R^{29}$ may form a monocyclic aromatic ring together with a carbon atom to which they are bonded. Also, when there are two or more hydrocarbon groups or halogenated hydrocarbon groups other than groups forming an aromatic ring, they are optionally bonded together to become cyclic. In addition, when $R^{29}$ is a substituent other than an aromatic group, it is preferably a hydrogen atom. $X^1$ and $X^2$ may be the same or different from each other, and represent a hydrogen atom, a halogen atom, a hydrocarbon group having 1 to 20 carbon atoms, a halogenated hydrocarbon group having 1 to 20 carbon atoms, an oxygen-containing group or a sulfur-containing group. Y represents a divalent hydrocarbon group having 1 to 20 carbon atoms, a divalent halogenated hydrocarbon group having 1 to 20 carbon atoms, a divalent silicon-containing group, a divalent germanium-containing group, a divalent tin-containing group, —O—, —CO—, —S—, —SO—, —SO$_2$—, —NR$^{30}$—, —P(R$^{30}$)—, —P(O) (R$^{30}$)—, —BR$^{30}$— or —AlR$^{30}$— (provided that $R^{30}$ is a hydrogen atom, a halogen atom, a hydrocarbon group having 1 to 20 carbon atoms or a halogenated hydrocarbon group having 1 to 20 carbon atoms).

In the formula (4), examples of a ligand which coordinates to $M^3$, wherein at least one pair of $R^{26}$ and $R^{27}$, $R^{27}$ and $R^{28}$, and $R^{28}$ and $R^{29}$ forms a monocyclic aromatic ring by bonding each member of the pair together, include a ligand represented by the following formulas,

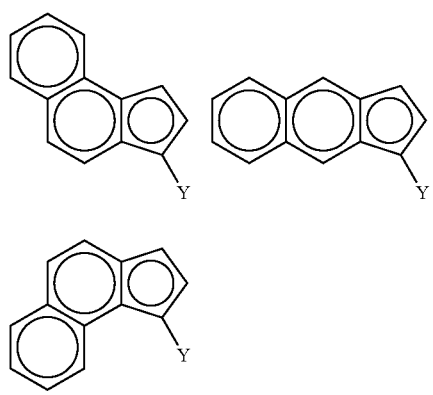

(wherein Y is the same as that shown above.)

EXAMPLE 4 OF THE METALLOCENE COMPOUND

Moreover, a metallocene compound represented by the following general formula (5) may be used as the metallocene compound.

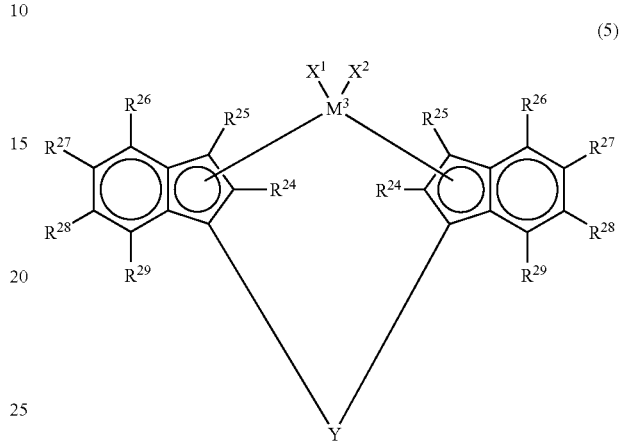

(5)

In the formula (5), $M^3$, $R^{24}$, $R^{25}$, $R^{26}$, $R^{27}$, $R^{28}$ and $R^{29}$ are the same as those of the general formula (4) described above. Among $R^{26}$, $R^{27}$, $R^{28}$ and $R^{29}$, preferably two groups including $R^{26}$ are an alkyl group, and preferably $R^{26}$ and $R^{28}$, or $R^{28}$ and $R^{29}$ are an alkyl group. This alkyl group preferably is a secondary or tertiary alkyl group. Also, this alkyl group is optionally substituted with a halogen atom or a silicon-containing group, and examples of the halogen atom and the silicon-containing group include a substituent exemplified by $R^{24}$ and $R^{25}$. Among $R^{26}$, $R^{27}$, $R^{28}$ and $R^{29}$, a group other than the alkyl group preferably is a hydrogen atom. Moreover, two kinds of groups selected from $R^{26}$, $R^{27}$, $R^{28}$ and $R^{29}$ may be bonded together to form a monocyclic ring or a polycyclic ring other than an aromatic ring. Examples of the halogen atom include the same as that of $R^{24}$ and $R^{25}$. Examples of $X^1$, $X^2$ and Y include the same as those described above.

Specific examples of the metallocene compound represented by the above general formula (5) include rac-dimethylsilylene-bis(4,7-dimethyl-1-indenyl)zirconiumdichloride, rac-dimethylsilylene-bis (2,4,7-trimethyl-1-indenyl)zirconiumdichloride, rac-dimethylsilylene-bis(2,4,6-trimethyl-1-indenyl)zirconiumdichloride and the like.

In these compounds, a transition metal compound in which zirconium metal is replaced by titanium metal or hafnium metal may be used. While the transition metal compound is typically used as a racemic body, an R-type or S-type compound may be utilized.

EXAMPLE 5 OF THE METALLOCENE COMPOUND

A metallocene compound represented by the following general formula (6) may also be used as the metallocene compound.

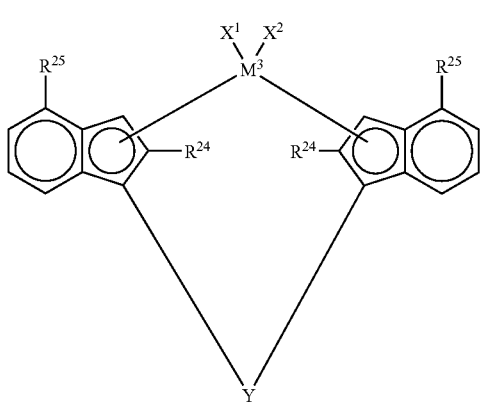
(6)

In the formula (6), $M^3$, $R^{24}$, $X^1$, $X^2$ and Y are the same as those in the above general formula (4). $R^{24}$ preferably is a hydrocarbon group, and especially preferable is an alkyl group having 1 to 4 carbon atoms of methyl, ethyl, propyl or butyl. $R^{25}$ represents an aryl group having 6 to 16 carbon atoms. $R^{25}$ preferably is phenyl or naphthyl. The aryl group is optionally substituted with a halogen atom, a hydrocarbon group having 1 to 20 carbon atoms or a halogenated hydrocarbon group having 1 to 20 carbon atoms. $X^1$ and $X^2$ preferably are a halogen atom or a hydrocarbon group having 1 to 20 carbon atoms.

Specific examples of the metallocene compound represented by the above general formula (6) include rac-dimethylsilylene-bis(4-phenyl-1-indenyl)zirconiumdichloride, rac-dimethylsilylene-bis(2-methyl-4-phenyl-1-indenyl)zirconiumdichloride, rac-dimethylsilylene-bis(2-methyl-4-(α-naphthyl)-1-indenyl)zirconiumdichloride, rac-dimethylsilylene-bis(2-methyl-4-(β-naphthyl)-1-indenyl)zirconiumdichloride, rac-dimethylsilylene-bis(2-methyl-4-(1-anthryl)-1-indenyl)zirconiumdichloride and the like. Also, in these compounds, a transition metal compound in which zirconium metal is replaced by titanium metal or hafnium metal may be used.

EXAMPLE 6 OF THE METALLOCENE COMPOUND

Furthermore, a metallocene compound represented by the following general formula (7) may also be used as the metallocene compound.

$$LaM^4X^3{}_2 \qquad (7)$$

Here, $M^4$ is a metal of Group IV elements in the periodic table or a metal of lanthanide series. La is a derivative of a delocalized π-bonded group, which is a group giving the restricted geometric structure to a metal $M^4$ active site. $X^3$ may be the same or different from each other, and is a hydrogen atom, a halogen atom, a hydrocarbon group having 20 carbon atoms or less, a silyl group having 20 carbon atoms or less and containing silicon, or a germyl group having 20 carbon atoms or less and containing germanium.

Among these compounds, a compound represented by the following formula (8) is preferable.

(8)

In the formula (8), $M^4$ is titanium, zirconium or hafnium. $X^3$ is the same as that explained by the above general formula (7). Cp is a substituted cyclopentadienyl group which is π-bonded to $M^4$ and has a substituent Z. Z is oxygen, sulfur, boron or an element of Group IV in the periodic table (for example, silicon, germanium or tin). Y is a ligand containing nitrogen, phosphorus, oxygen or sulfur, and may form a condensed ring with Z and Y. Specific examples of such metallocene compounds represented by the general formula (8) include (dimethyl(t-butylamido) (tetramethyl-η$^5$-cyclopentadienyl)silane)titanium dichloride, ((t-butylamido) (tetramethyl-η$^5$-cyclopentadienyl)-1,2-ethanediyl)titanium dichloride and the like. Moreover, in this metallocene compound, a compound in which titanium is replaced by zirconium or hafnium may be exemplified.

EXAMPLE 7 OF THE METALLOCENE COMPOUND

Furthermore, a metallocene compound represented by the following general formula (9) may also be used as the metallocene compound.

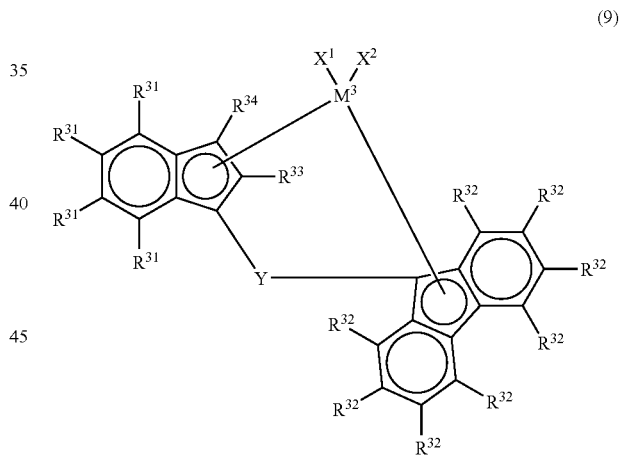
(9)

In the formula (9), $M^3$ is a transition metal of Group IV elements in the periodic table, and specifically is titanium, zirconium or hafnium, preferably is zirconium. $R^{31}$ may be the same or different from each other, and at least one of them is an aryl group having 11 to 20 carbon atoms, an arylalkyl group having 12 to 40 carbon atoms, an arylalkenyl group having 13 to 40 carbon atoms, an alkylaryl group having 12 to 40 carbon atoms or a silicon-containing group, or at least two adjacent groups of the groups represented $R^{31}$ form a single or a plurality of aromatic rings or aliphatic rings together with a carbon atom to which they are bonded. In this case, a ring formed by $R^{31}$ has a total of 4 to 20 carbon atoms, including the carbon atoms to which $R^{31}$ is bonded. $R^{31}$, except for an aryl group, an arylalkynyl group, an arylalkenyl group, an alkylaryl group, and $R^{31}$ forming an aromatic ring or an aliphatic ring, is a hydrogen atom, a halogen atom, an alkyl group having 1 to 10 carbon atoms or a silicon-containing group. $R^{32}$ may be the same or different from each other, and are a hydrogen atom, a halogen atom, an alkyl group having 1 to 10 carbon atoms, an aryl group having 6 to 20 carbon atoms, an alkenyl group having 2 to 10 carbon atoms, an arylalkyl group having 7 to 40 carbon atoms, an arylalkenyl group having 8 to 40 carbon atoms, an alkylaryl group having 7 to 40 carbon atoms, a silicon-containing group, an oxygen-containing group, a sulfur-containing group, a nitrogen-containing group or a phosphorus-containing group. Also, at least two adjacent groups of the groups represented by $R^{32}$ may form a single or a plurality of aromatic rings or aliphatic rings together with a carbon atom to which they are bonded. In this case, a ring formed by $R^{32}$ has a total of 4 to 20 carbon atoms, including the carbon atom to which $R^{32}$ is bonded. And $R^{32}$, except for $R^{32}$ forming an aromatic ring or an aliphatic ring, is a hydrogen atom, a halogen atom, an alkyl group having 1 to 10 carbon atoms or a silicon-containing group. Moreover, among groups composed by two groups represented by $R^{32}$, wherein the two groups form a single or a plurality of aromatic rings or aliphatic rings, an embodiment wherein a fluorenyl group has a structure of the following formula is included.

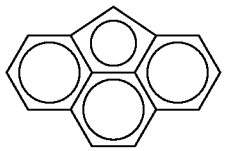

$R^{32}$ is preferably a hydrogen atom or an alkyl group, and especially preferable is a hydrogen atom or a hydrocarbon group having 1 to 3 carbon atoms of methyl, ethyl and propyl. A fluorenyl group having $R^{32}$ as such a substituent is preferably exemplified by 2,7-dialkyl-fluorenyl group. As an alkyl group of 2,7-dialkyl of this case, an alkyl group having 1 to 5 carbon atoms is exemplified. Also, $R^{31}$ and $R^{32}$ may be the same or different from each other. $R^{33}$ and $R^{34}$ may be the same or different from each other, and are a hydrogen atom, a halogen atom, an alkyl group having 1 to 10 carbon atoms, an aryl group having 6 to 20 carbon atoms, an alkenyl group having 2 to 10 carbon atoms, an arylalkyl group having 7 to 40 carbon atoms, an arylalkenyl group having 8 to 40 carbon atoms, an alkylaryl group having 7 to 40 carbon atoms, a silicon-containing group, an oxygen-containing group, a sulfur-containing group, a nitrogen-containing group or a phosphorus-containing group, as is the same as above. Among these groups, at least one of $R^{33}$ and $R^{34}$ is preferably an alkyl group having 1 to 3 carbon atoms. $X^1$ and $X^2$ may be the same or different from each other, and are a hydrogen atom, a halogen atom, a hydrocarbon group having 1 to 20 carbon atoms, a halogenated hydrocarbon group having 1 to 20 carbon atoms, an oxygen-containing group, a sulfur-containing group or a nitrogen-containing group, or a conjugated diene residue formed by $X^1$ and $X^2$. The conjugated diene residue formed by $X^1$ and $X^2$ is preferably a 1,3-butadiene, 2,4-hexadiene, 1-phenyl-1,3-pentadiene and 1,4-diphenylbutadiene residue, and these residues are optionally further substituted by a hydrocarbon group having 1 to 10 carbon atoms. $X^1$ and $X^2$ are preferably a halogen atom, a hydrocarbon group having 1 to 20 carbon atoms or a sulfur-containing group. Y represents a divalent hydrocarbon group having 1 to 20 carbon atoms, a divalent halogenated hydrocarbon group having 1 to 20 carbon atoms, a divalent silicon-containing group, a divalent germanium-containing group, a divalent tin-containing group, —O—, —CO—, —S—, —SO—, —SO$_2$—, —NR$^{35}$—, —P(R$^{35}$)—, —P(O)(R$^{35}$)—, —BR$^{35}$— or —AlR$^{35}$— (provided that $R^{35}$ is a hydrogen atom, a halogen atom, a hydrocarbon group having 1 to 20 carbon atoms or a halogenated hydrocarbon group having 1 to 20 carbon atoms). Of these divalent groups, a group in which the shortest bonding moiety of —Y— is composed of one or two atoms is preferable. Also, $R^{35}$ is a halogen atom, a hydrocarbon group having 1 to 20 carbon atoms or a halogenated hydrocarbon group having 1 to 20 carbon atoms. Y is preferably a divalent hydrocarbon group having 1 to 5 carbon atoms, a divalent silicon-containing group or a divalent germanium-containing group, more preferably a divalent silicon-containing group, especially preferably alkylsilylene, alkylarylsilylene or arylsilylene.

EXAMPLE 8 OF THE METALLOCENE COMPOUND

Moreover, a metallocene compound represented by the following general formula (10) may also be used as the metallocene compound.

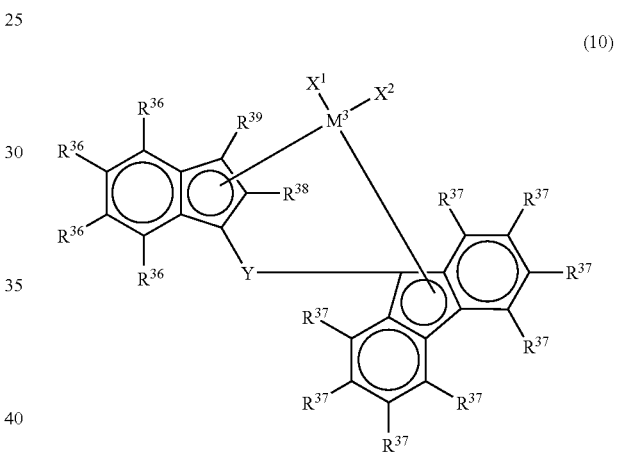

In the formula (10), $M^3$ is a transition metal atom of Group IV elements in the periodic table, specifically titanium, zirconium or hafnium, preferably zirconium. $R^{36}$ may be the same or different from each other, and is a hydrogen atom, a halogen atom, an alkyl group having 1 to 10 carbon atoms, an aryl group having 6 to 10 carbon atoms, an alkenyl group having 2 to 10 carbon atoms, a silicon-containing group, an oxygen-containing group, a sulfur-containing group, a nitrogen-containing group or a phosphorus-containing group. In addition, the above alkyl group and alkenyl group may be substituted with a halogen atom. Among these, $R^{36}$ is preferably an alkyl group, an aryl group or a hydrogen atom, and especially preferably a hydrocarbon group having 1 to 3 carbon atoms of methyl, ethyl, n-propyl or i-propyl, an aryl group such as phenyl, α-naphthyl, β-naphthyl and the like or a hydrogen atom. $R^{37}$ may be the same or different from each other, and are a hydrogen atom, a halogen atom, an alkyl group having 1 to 10 carbon atoms, an aryl group having 6 to 20 carbon atoms, an alkenyl group having 2 to 10 carbon atoms, an arylalkyl group having 7 to 40 carbon atoms, an arylalkenyl group having 8 to 40 carbon atoms, an alkylaryl group having 7 to 40 carbon atoms, a silicon-containing group, an oxygen-containing group, a sulfur-containing group, a nitrogen-containing group or a phosphorus-containing group. Furthermore, the above alkyl group, aryl group, alkenyl group, arylalkyl group, arylalkenyl group or alkylaryl group is optionally substituted with a halogen. Among these, $R^{37}$ is preferably a hydrogen atom or an alkyl group, and especially preferably a hydrogen atom or a hydrocarbon group having 1 to 4 carbon atoms of methyl, ethyl, n-propyl, i-propyl, n-butyl and tert-butyl. In addition, the above $R^{36}$ and $R^{37}$ may be the same or different from each other. One of $R^{38}$ and $R^{39}$ is an alkyl group having 1 to 5 carbon atoms, and other is a hydrogen atom, a halogen atom, an alkyl group having 1 to 10 carbon atoms, an alkenyl group having 2 to 10 carbon atoms, a silicon-containing group, an oxygen-containing group, a sulfur-containing group, a nitrogen-containing group or a phosphorus-containing group. Of these groups, one of $R^{38}$ and $R^{39}$ is preferably an alkyl group having 1 to 3 carbon atoms such as methyl, ethyl, propyl and the like, and the other is preferably a hydrogen atom. $X^1$ and $X^2$ may be the same or different from each other, and are a hydrogen atom, a halogen atom, a hydrocarbon group having 1 to 20 carbon atoms, a halogenated hydrocarbon group having 1 to 20 carbon atoms, an oxygen-containing group, a sulfur-containing group or a nitrogen-containing group or a conjugated diene residue formed by $X^1$ and $X^2$. Of these groups, a halogen atom or a hydrocarbon group having 1 to 20 carbon atoms is preferable. Y represents a divalent hydrocarbon group having 1 to 20 carbon atoms, a divalent halogenated hydrocarbon group having 1 to 20 carbon atoms, a divalent silicon-containing group, a divalent germanium-containing group, a divalent tin-containing group, —O—, —CO—, —S—, —SO—, —SO$_2$—, —NR$^{40}$—, —P(R$^{40}$)—, —P(O)(R$^{40}$)—, —BR$^{40}$— or —AlR$^{40}$— (provided that $R^{40}$ is a hydrogen atom, a halogen atom, a hydrocarbon group having 1 to 20 carbon atoms, or a halogenated hydrocarbon group having 1 to 20 carbon atoms). Of these divalent groups, Y is preferably a divalent hydrocarbon group having 1 to 5 carbon atoms, a divalent silicon-containing group or a divalent germanium-containing group, more preferably a divalent silicon-containing group, and especially preferably alkylsilylene, alkylarylsilylene or arylsilylene.

The metallocene compounds explained above are used alone or in a combination of two or more kinds. Moreover, the metallocene compounds may be diluted in a hydrocarbon or a halogenated hydrocarbon.

(An Organoaluminum Oxy-Compound)

An organoaluminum oxy-compound may be a known aluminoxane or a benzene-insoluble organoaluminum oxy-compound. Such a known aluminoxane is represented specifically by the following formulas.

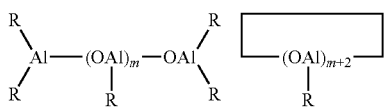

Wherein, R is a hydrocarbon group such as a methyl group, an ethyl group, a propyl group and a butyl group, preferably a methyl group or an ethyl group, especially preferably a methyl group, and m is 2 or larger, preferably an integer from 5 to 40.

An aluminoxane may be composed of a mixed alkyloxyaluminum unit consisting of an alkyloxyaluminum unit represented by the formula (OAl (R')) and an alkyloxyaluminum unit represented by the formula (OAl (R")) (wherein, R' and R" may be exemplified by a similar hydrocarbon group to that of R, and R' and R" represent a distinct group). Moreover, an organoaluminum oxy-compound may contain a small amount of an organometallic compound component other than that of aluminum.

(An Ionized Ionic Compound)

An ionized ionic compound (which may sometimes be called "ionic ionized compound" or "ionic compound") may be exemplified by a Lewis acid, an ionic compound, a borane compound and a carborane compound. As a Lewis acid, there may be exemplified a compound represented by BR$_3$ (R is a phenyl group which is optionally substituted with a fluorine, a methyl group, a trifluoromethyl group or the like, or fluorine). Specific examples of a Lewis acid include trifluoroboron, triphenylboron, tris(4-fluorophenyl)boron, tris(3,5-difluorophenyl)boron, tris(4-fluoromethylphenyl)boron, tris (pentafluorophenyl)boron, tris(p-tolyl)boron, tris(o-tolyl) boron, tris(3,5-dimethylphenyl)boron and the like.

Examples of the above ionic compounds include a trialkyl-substituted ammonium salt, an N,N-dialkylanilinium salt, a dialkylammonium salt, a triarylphosphonium salt and the like. Examples of a trialkyl-substituted ammonium salt as the ionic compound include triethylammoniumtetra(phenyl)boron, tripropylammoniumtetra(phenyl)boron, tri(n-butyl)ammoniumtetra(phenyl)boron and the like. Examples of a dialkylammonium salt as the ionic compound include di(1-propyl)ammoniumtetra(pentafluorophenyl)boron, dicyclohexylammoniumtetra(phenyl)boron and the like.

Example of the above ionic compounds also include triphenylcarbeniumtetrakis(pentafluorophenyl)borate, N,N-dimethylaniliniumtetrakis(pentafluorophenyl)borate, ferroceniumtetra(pentafluorophenyl)borate and the like.

Examples of the above borane compound include decaborane(9); bis[tri(n-butyl)ammonium]nonaborate, bis[tri(n-butyl)ammonium]decaborate, a salt of a metallic borane anion such as bis[tri(n-butyl)ammonium]bis(dodecahydridododecaborate)nickelate (III) and the like, and the like.

Examples of the above carborane compound include 4-carbanonaborane (9), 1,3-dicarbanonaborane (8), a salt of a metallic carborane anion such as bis[tri(n-butyl)ammonium] bis(undecahydrido-7-carbaundecaborate)nickelate (IV).

These ionized ionic compounds may be used alone or in a combination of two or more kinds.

Furthermore, in forming a metallocene-based catalyst, an organoaluminum compound described below may be used together with an organoaluminum oxy-compound and/or an ionized ionic compound.

(An Organoaluminum Compound)

As an organoaluminum compound which is used when needed, a compound which has at least one Al-carbon bond in the molecule may be used. These compounds may be exemplified by an organoaluminum compound represented, for example, by the following general formula (11),

  (11)

(wherein, $R^6$ and $R^7$ may be the same or different from each other, and are a hydrocarbon group containing typically 1 to 15 carbon atoms, preferably 1 to 4 carbon atoms, $X^4$ is a halogen atom, m, n, p and q are each integer satisfying the conditions: $0<m\leq3$, $0\leq n<3$, $0\leq p<3$, and $0\leq q<3$, and in addition $m+n+p+q=3$), and an alkyl complex compound composed of a Group 1 metal and aluminum, represented by the following general formula (12):

  (12)

(wherein, $M^5$ is Li, Na or K, and $R^6$ is the same as $R^6$ in the above general formula (11)), and the like.

(Polymerization)

A polyethylene-based wax used in the present invention is obtained by, for example, homopolymerizing ethylene in a liquid phase or copolymerizing ethylene with at least one or more α-olefins selected from α-olefins having 3 to 20 carbon atoms in a liquid phase in the presence of the above metallocene-based catalyst. In this case, although a hydrocarbon solvent is generally used, α-olefins may also be used as a solvent. Moreover, each monomer used herein is as described above.

Available polymerization methods include suspension polymerization wherein polymerization is carried out in a state where a polyethylene-based wax is present as particles in a solvent such as hexane, vapor phase polymerization wherein polymerization is carried out without using a solvent and solution polymerization wherein polymerization is carried out in a state where the polyethylene-based wax is melted together with a solvent or alone at a polymerization temperature of 140° C. or higher, and among them, the solution polymerization is preferable in the aspects of both economic efficiency and product quality. The polymerization reaction may be carried out by either a batch process or a continuous process.

When the polymerization is carried out by a batch process, the above catalyst component is usually used at the following concentrations. The concentration of the metallocene compound in the polymerization system generally ranges from 0.00005 to 0.1 mmol/L (polymerization volume), preferably from 0.0001 to 0.05 mmol/L. The organoaluminum oxy-compound is supplied generally at an amount of 1 to 10000, preferably 10 to 5000 by the mole ratio (Al/transition metal) of aluminum atom to the transition metal in the metallocene compound in the polymerization system. The ionized ionic compound is supplied generally at an amount of 0.5 to 20, preferably 1 to 10 by the mole ratio (ionized ionic compound/metallocene compound) of the ionized ionic compound to the metallocene compound in the polymerization system. Also, when the organoaluminum compound is used, it is generally used at a concentration from about 0 to 5 mmol/L (polymerization volume), preferably from about 0 to 2 mmol/L.

The polymerization reaction is carried out under the conditions including the temperature range from −20 to +150° C., preferably from 0 to 120° C., more preferably from 0 to 100° C. and the pressure range from above 0 to 7.8 MPa (80 kgf/cm$^2$, gauge pressure) or less, preferably from above 0 to 4.9 MPa (50 kgf/cm$^2$, gauge pressure) or less. Ethylene and an α-olefin used as needed in the polymerization process are supplied to the polymerization system at the ratio of the amount so that the above-described particular composition of the polyethylene-based wax can be obtained. Furthermore, a molecular weight modifier such as hydrogen may be added in the polymerization. By carrying out the polymerization as above, the produced polymer is obtained as a polymerization liquid containing the polymer, therefore, the polyethylene-based wax is obtained by treating the liquid by a conventional means. A manufacturing method of the polyethylene-based wax used in the present invention is preferably a polymerization method using a catalyst containing a metallocene compound especially exemplified in (Example 6 of the metallocene compound).

(Pulverization Method of the Polyethylene-Based Wax)

When a polyethylene-based wax is added to a printing ink, the polyethylene-based wax is commonly used in the form of a fine powder, an additive comprising the fine powder or a solvent dispersion (dispersion). The volume average particle diameter of the fine powder, the additive comprising the fine powder or the fine particles contained in the solvent dispersion ranges preferably from 0.3 to 10 μm, more preferably 0.5 to 5 μm. When the particles of the polyethylene-based wax have the volume average particle diameter within the range, the balance between abrasion resistance and gloss of a printing ink surface is excellent. As a method for obtaining such fine particles of the polyethylene-based wax, although there is no limitation if it is a method for pulverizing the polyethylene-based wax, a pulverizing method using, for example, a jet mill, a ball mill and the like may be exemplified. Furthermore, in order to produce fine particles of the polyethylene-based wax, it is desirable to prepare the particles having a volume average particle diameter of 500 μm or less in advance by preliminary pulverization with a pulverizer such as a pin mill, a screen mill, a tube mill and the like. In addition, in the preliminary pulverization, it is possible to use a granulation method other than pulverization such as a crystallization method using a solvent, a spray granulation and the like.

(A Method for Producing a Solvent Dispersion of the Polyethylene-Based Wax)

As a method for producing a solvent dispersion of a non-aromatic solvent of the polyethylene-based wax according to the present invention, a method using a wet ball mill is preferable. The polyethylene-based wax is preferably pulverized to particles having a volume average particle diameter of 500 μm or less in advance by the methods described above. Examples of non-aromatic solvents used in this case include an ester-based solvent such as methyl acetate, ethyl acetate, n-propyl acetate, isopropyl acetate and the like, a ketone-based solvent such as acetone, methylethylketone and the like, an alcohol-based solvent such as methanol, ethanol, n-propylalcohol, isopropylalcohol and the like. In a solvent dispersion of the polyethylene-based wax of the present invention, these solvents may be used alone or in a combination of two or more kinds.

(Printing Ink Compositions)

As a printing ink composition containing no non-aromatic solvents, which is formed by adding fine particles (fine powder) of the polyethylene-based wax or its solvent dispersion used in the present invention, there may be exemplified a printing ink composition in which a polyurethane resin or a polyurethane polyurea resin is used as a binder, and an ester-based solvent such as methyl acetate, ethyl acetate, n-propyl acetate, isopropyl acetate and the like, a ketone-based solvent such as acetone, methylethylketone and the like or an alcohol-based solvent such as methanol, ethanol, n-propylalcohol, isopropylalcohol and the like is used as a solvent singly or in a combination of two or more kinds. Moreover, the resin solid content concentration of the binder in the printing ink composition is determined appropriately by considering workability in printing, printing effects and the like, and is preferably adjusted to 3 to 50 wt. %, although not limited in particular.

An additive comprising the polyethylene-based wax or its solvent dispersion of the present invention is preferably added to be contained at a ratio of 0.1 to 10 wt. %, more preferably 0.5 to 5 wt. % based on the total weight of the printing ink composition. The polyethylene-based wax may be used alone or in a combination of two or more kinds.

When the content of the polyethylene-based wax falls within the range described above, the balance between abrasion resistance and blocking resistance of the printing ink is excellent.

With respect to the method of adding the polyethylene-based wax, it may be added by any step in the conventional printing ink production processes. That is, an ink may be produced from a mixture prepared by dispersing both pigments and the polyethylene-based wax in varnish and kneading the resultant mixture, or by mixing an additive comprising the polyethylene-based wax or its solvent dispersion with a material prepared through the processes of dispersion and kneading.

EXAMPLES

Hereinafter, the present invention will be explained more specifically with reference to Examples, but it should be construed that the invention is in no way limited to these Examples. Moreover, unless otherwise specified, parts described in these Examples represent weight part.

The physical properties of the polyethylene-based wax were determined according to the following measurement methods.

Melt viscosity: The melt viscosity of the wax was measured at 140° C. using a Brookfield viscometer.

Intrinsic viscosity [η]: The intrinsic viscosity [η] was measured in accordance with ASTM D1601.

Density: The density was measured in accordance with JIS K6760.

Penetration hardness: The penetration hardness was measured in accordance with JIS K2207.

Acid value: The acid value was measured in accordance with JIS K5902.

Mw/Mn: The ratio (Mw/Mn) of weight average molecular weight (Mw) to number average molecular weight (Mn) measured by GPC was evaluated. Used were Alliance 2000 (Waters Corporation) as the GPC measuring instrument, TSKgel $GMH_6$-HT×2+TSKgel $GMH_6$-HTL×2 (each 7.5 mm I.D.×30 cm, Tosoh Corporation) as the column, and o-dichlorobenzene (Wako Pure Chemical Industries Ltd., analytical grade reagent) as the mobile phase. The measurement was performed under the conditions including the column temperature of 140° C. and the mobile phase flow rate of 1.0 mL/min, and a differential refractometer was used for detection. A monodispersed polystyrene was used for the molecular weight calibration.

Mz/Mw: The ratio (Mz/Mw) of z-average molecular weight (Mz) to weight average molecular weight (Mw) was evaluated by a method similar to that used in the above Mw/Mn.

Hereinafter, synthetic examples of the polyethylene-based wax used in the present invention will be described.

Example 1

Synthetic Example 1 of the Polyethylene-Based Wax

By using a metallocene catalyst, a polyethylene-based wax was synthesized as follows. A SUS autoclave having an internal volume of 2 l which was sufficiently purged with nitrogen was charged with 970 ml of hexane and 30 ml of propylene, and hydrogen was introduced into the autoclave up to a pressure of 1.3 kg/cm² (gauge pressure). Then, after the temperature in the system was increased to 150° C., polymerization was started by adding 0.3 mmol of triisobutylaluminum, 0.004 mmol of triphenylcarbenium tetrakis(pentafluorophenyl)borate, 0.02 mmol of (t-butylamido) dimethyl(tetramethyl-$\eta^5$-cyclopentadienyl)silanetitaniumdichloride (produced by Sigma-Aldrich Corporation) by pressure-injection with ethylene. Thereafter, only ethylene was continuously fed to the autoclave to maintain the total pressure at 30 kg/cm² (gauge pressure), and the polymerization was carried out at 150° C. for 20 min.

After the polymerization was terminated by adding a small amount of ethanol to the system, unreacted ethylene and propylene were purged. The resultant polymer solution was dried at 100° C. overnight under reduced pressure. As a result, 85.5 g of a polyethylene-based wax was obtained with the following physical properties: [η]=0.13 dl/g, the density of 941 kg/m³, Mw/Mn=2.6, Mz/Mw=1.7, and the penetration hardness of 4 dmm.

The above synthetic operation was repeated 5 times and batches of the polyethylene-based wax obtained by the 5 synthetic operations were melted and mixed, and then were cooled to obtain Sample 1.

Production Example 1 of the Oxidized Polyethylene-Based Wax

An oxidation reaction was carried out in a 2 l autoclave (equipped with a thermometer, a pressure gauge, a gas introduction tube and a gas discharge tube). After 400 g of a polyethylene-based wax (Sample 1) was melted and the internal temperature reached 165° C., a stirrer was set to 300 min⁻¹ and air was introduced into the molten material at 1.2 l/min. At this time, the internal pressure indicated 0.69 MPa. While introducing air, the reaction conditions were maintained such that the temperature was 165° C., the stirring rate was 300 min⁻¹ and the pressure was 0.69 MPa, and then the reaction was terminated after 1 hr. As a result, a polyethylene-based wax (Sample 1-E) was obtained with the following physical properties: [η]=0.13 dl/g, the density of 941 kg/m³, Mw/Mn=2.6, Mz/Mw=1.7, the penetration hardness of 3 dmm and the acid value of 1.1 KOH-mg/g.

Production Example 1 of a Solvent Dispersion of the Polyethylene-Based Wax

After adding 25 weight parts of Sample 1-E which volume average particle diameter was reduced to 150 μm by preliminary pulverization with a pulverizer and 40 weight parts of a solvent (20 weight parts of isopropyl alcohol and 20 weight parts of ethyl acetate) into a 1 l chromium-steel ball mill, the ball mill was sealed and then rotary pulverization was performed for 24 hrs. Subsequently, 35 weight parts of a solvent having the above composition were added to the ball mill to dilute the polyethylene-based wax and to adjust the solid content to 25 wt. %. The volume average particle diameter of the resultant solvent dispersion (Dispersion 1) was determined to be 4.5 μm as measured by Microtrac (Honeywell Int'l Inc.: HRA).

Storage Stability Evaluation Example 1 of the Solvent Dispersion

Dispersion 1 was placed in a test tube (30 Ø×200 mm) and was allowed to stand at room temperature for 10 days, and then the height of a solvent layer formed by precipitation of the wax was evaluated. As the height is lower, the storage stability is more excellent. The results are shown in Table 2.

Production Example 1 of a Printing Ink not Containing an Aromatic Solvent

To a four-necked flask equipped with a stirrer, a thermometer, a reflux condenser and a nitrogen gas introduction tube, 1000 parts of polyesterdiol having a number average molecular weight of 2000 obtained from adipic acid and 3-methyl-1,5-pentanediol and 222 parts of isophoronediisocyanate were added, and the reaction was performed at 90° C. for 6 hrs under a nitrogen flow. Subsequently, 82 parts of isophoronediamine, 7.8 parts of di-n-butylamine, 2143 parts of ethyl acetate and 918 parts of isopropyl alcohol were added, and the reaction was carried out at 50° C. for 3 hrs while stirring to obtain a polyurethane resin solution (A) having the solid content of 30%, the viscosity of 600 cps at 25° C. and the number average molecular weight of 45,000.

Next, after 50 weight parts of the urethane resin solution (A), 10 weight parts of a pigment, 22 weight parts of ethyl acetate, 5 weight parts of isopropyl alcohol, 10 weight parts of propylene glycol monomethyl ether, 3 weight parts of pure water and 3 weight parts of the above Dispersion 1 were combined, the mixture was stirred and mixed, and then the pigment was dispersed using a sand mill in accordance with a conventional method to obtain a printing ink composition (Ink 1). Disazo yellow (Lionol Yellow 1405G produced by Toyo Ink Mfg. Co., Ltd.) was used as a pigment.

Printing Example 1 of the Printing Ink

The evaluation of printing was conducted by diluting Ink 1 with a diluent solvent (composition: ethyl acetate/isopropyl alcohol=60 weight parts/40 weight parts) and adjusting the viscosity to 15 sec with Zahn Cup #3 (manufactured by Rigo Co., Ltd.) and then printing on a processed OPP film (P-2161 produced by Toyobo Ltd., thickness: 20 μm) by a gravure printing machine. A photogravure was used which has an imposition of a gradation area (5 to 40μ) and a solid area of 35μ.

Evaluation Example 1 of Abrasion Resistance and Blocking Resistance

In accordance with the following methods, the above film printed with Ink 1 was evaluated for abrasion resistance and blocking resistance. The results are shown in Table 2.

Abrasion Resistance Evaluation Method

[1] Use of a Gakushin-type reciprocal friction resistance tester II Type (Tester Sangyo Co., Ltd.)
Friction paper: CRC cardboard
Load×Friction frequency: 200 g×1000 times
[2] Evaluation: A four-stage evaluation is conducted based on the degree of transfer of an ink to the cardboard after rubbing the printed surface with the cardboard fixed to the friction element.
(good) 4-3-2-1 (poor)
4: Excellent in abrasion resistance, and almost no ink sticking to the cardboard.
3: Excellent in abrasion resistance, but slight ink sticking to the cardboard is recognized.
2: Ink sticking to the cardboard is clearly recognized.
1: Ink sticking to the cardboard is significant.

Blocking Resistance Evaluation Method

[1] Two sheets of the above ink printing film are overlapped by bringing the printed surfaces facing each other and pinched by lath plates, on which a weight is mounted on a smooth platform so that the load becomes 10 g/cm². After leaving the test sample to stand in constant temperature and humidity (25° C., 50%) for 24 hrs, a four-step evaluation is conducted based on the status when the two sheets are separated.
(good) 4-3-2-1 (poor)
4. The printed surface has no damage.
3. Cohesive failure is slightly observed in the ink on the peeling surface, and a slight force is required when peeling off the two sheets.
2. Cohesive failure is clearly observed in the ink on the peeling surface, and a strong force is required when peeling off the two sheets.
1. An interface peeling between the ink and the cardboard is observed when peeling off the two sheets.

Example 2

Synthetic Example 2 of the Polyethylene-Based Wax

By using exactly the same method as in the Synthetic Example 1 of the polyethylene-based wax described in Example 1 except that the pressure of hydrogen was changed 0.9 kg/cm² (gauge pressure), synthesis of a polyethylene-based wax was carried out. As a result, 42.2 g of the polyethylene-based wax was obtained with the following physical properties: [η]=0.23 dl/g, the density of 954 kg/m³, Mw/Mn=3.1, Mz/Mw=1.7 and the penetration hardness of 1 dmm.

The above synthetic operation was repeated ten times and batches of the polyethylene-based wax obtained by the ten synthetic operations were melted and mixed, and then were cooled to obtain Sample 2.

Production Example 2 of the Oxidized Polyethylene-Based Wax

By using exactly the same method as in Production Example 1 of the oxidized polyethylene-based wax described in Example 1 except that Sample 1 was changed to Sample 2, the oxidation reaction was carried out. As a result, a polyethylene-based wax (Sample 2-E) was obtained with the following physical properties: [η]=0.23 dl/g, the density of 953 kg/m³, Mw/Mn=3.1, Mz/Mw=1.7, the penetration hardness of 1 dmm and the acid value of 1.2 KOH-mg/g).

Production Example 2 of a Solvent Dispersion of the Polyethylene-Based Wax

Sample 2-E obtained by the above method was coarsely pulverized to 2 mm cubes using a table power mill (manufactured by Dalton Co., Ltd.). Subsequently, Sample 2-E was finely pulverized under the following conditions.
1) Equipment
Jet mill: Labo Jet Ultrasonic Pulverizer (Nippon Pneumatic Mfg. Co., Ltd.)
2) Pulverizing conditions
All samples used were immersed in a liquid nitrogen bath for 1 min or more immediately before pulverizing.
Sample feed rate: 1 g/min to 50 g/min (adjusted by particle diameter)
Primary air pressure: 6 kg/cm²G
Gas flow rate: 0.4 Nm³/min
Louver type: Three types; large, medium and small were used, and the particle diameter was adjusted by the balance of the clearance between the classification zone. (When the louver diameter is small and the classification clearance is large, the particle diameter becomes small.)
Gas flow rate: 0.4 Nm³/min The volume average particle diameter of the fine particles obtained by the above method was 5.2 μm as determined by Microtrac (Honeywell Int'l Inc.: HRA). Furthermore, 25 weight parts of the fine particles and 40 weight parts of a solvent (20 weight parts of isopropyl alcohol and 20 weight parts of ethyl acetate) were added to a 1 l chromium-steel ball mill, which was sealed, and then the mixture was subjected to rotary pulverization for 10 hrs. Thereafter, 35 weight parts of a solvent having the above composition were added to the ball mill to dilute the polyethylene-based wax and to adjust the solid content to 25 wt. %. The volume average particle diameter of the resultant solvent dispersion (Dispersion 2) was determined to be 4.3 μm as measured by Microtrac (Honeywell Int'l Inc.: HRA).

Storage Stability Evaluation Example 2 of the Solvent Dispersion

Using a method similar to that of the Storage Stability Evaluation Example 1 of the solvent dispersion described in Example 1, the storage stability of Dispersion 2 was evaluated. The results are shown in Table 2.

Production Example 2 of the Printing Ink not Containing an Aromatic Solvent

By using a method similar to that used in the case of the Production Example 1 of the printing ink not containing an aromatic solvent described in Example 1, except that Dispersion 1 was changed to Dispersion 2, a printing ink composition (Ink 2) was obtained.

Printing Example 2 of the Printing Ink

As with the Printing Example 1 of the printing ink described in Example 1, printing on a film was carried out using Ink 2.

Evaluation Example 2 of Abrasion Resistance and Blocking Resistance

As with the Evaluation Example 1 of abrasion resistance and blocking resistance described in Example 1, the above film printed with Ink 2 was evaluated for abrasion resistance and blocking resistance. The results are shown in Table 2.

Comparative Production Example 1 of a Solvent Dispersion of the Polyethylene-Based Wax By using exactly the same method as in Production Example 1 of the solvent dispersion of the polyethylene-based wax described in Example 1, except that Sample 1-E was changed to HW210MP (manufactured by Mitsui Chemicals, Inc., with physical properties: [η]=0.13 dl/g, the density of 940 kg/m$^3$, Mw/Mn=3.0, Mz/Mw=2.4, the penetration hardness of 3 dmm and the acid value of 1.0 KOH-mg/g), a solvent dispersion (Dispersion 3) of the polyethylene-based wax was obtained. The volume average particle diameter of Dispersion 3 was determined to be 4.7 μm as measured by Microtrac (Honeywell Int'l Inc.: HRA).

Storage Stability Comparative Evaluation Example 1 of the Solvent Dispersion

As with Storage Stability Evaluation Example 1 of the solvent dispersion described in Example 1, the storage stability of Dispersion 3 was evaluated. The results are shown in Table 2.

Comparative Production Example 1 of a Printing Ink not Containing an Aromatic Solvent By using the same method as in Production Example 1 of the printing ink not containing an aromatic solvent described in Example 1, except that Dispersion 1 was changed to Dispersion 3, a printing ink composition (Ink 3) was obtained.

Comparative Printing Example 1 of the Printing Ink

As with Printing Example 1 of the printing ink described in Example 1, printing on a film was carried out using Ink 3.

Comparative Evaluation Example 1 of Abrasion Resistance and Blocking Resistance

As with the Evaluation Example 1 of abrasion resistance and blocking resistance described in Example 1, the above film printed with Ink 3 was evaluated for abrasion resistance and blocking resistance. The results are shown in Table 3.

Comparative Production Example 2 of the Solvent Dispersion of the Polyethylene-Based Wax By using exactly the same method as in Production Example 2 of the solvent dispersion of the polyethylene-based wax described in Example 2, except that Sample 2-E was changed to HW410P (manufactured by Mitsui Chemicals, Inc., with physical properties: [η]=0.22 dl/g, the density of 950 kg/m$^3$, Mw/Mn=2.9, Mz/Mw=2.1, the penetration hardness of 1 dmm and the acid value of 0.0 KOH-mg/g), a solvent dispersion (Dispersion 4) of the polyethylene-based wax was obtained. The volume average particle diameter of Dispersion 4 was determined to be 4.3 μm as measured by Microtrac (Honeywell Int'l Inc.: HRA).

Storage Stability Comparative Evaluation Example 2 of the Solvent Dispersion

As with Storage Stability Evaluation Example 1 described in Example 1, the storage stability of Dispersion 4 was evaluated. The results are shown in Table 2.

Comparative Production Example 2 of a Printing Ink not Containing an Aromatic Solvent By using the same method as in Production Example 1 of the printing ink not containing an aromatic solvent described in Example 1, except that Dispersion 1 was changed to Dispersion 4, a printing ink composition (Ink 4) was obtained.

Comparative Printing Example 2 of the Printing Ink

As with Printing Example 1 described in Example 1, printing on a film was carried out using Ink 4.

Comparative Evaluation Example 2 of Abrasion Resistance and Blocking Resistance

As with Evaluation Example 1 of abrasion resistance and blocking resistance described in Example 1, the above film printed with Ink 4 was evaluated for abrasion resistance and blocking resistance. The results are shown in Table 3.

The physical properties of the polyethylene-based waxes used in Examples and Comparative Examples are shown in Table 1.

TABLE 1

Physical properties of polyethylene-based waxes

| Sample name | Examples | | Comparative Examples | |
|---|---|---|---|---|
| | Sample 1-E | Sample 2-E | HW210MP | HW410P |
| [η] | 0.13 | 0.23 | 0.13 | 0.22 |
| Mw/Mn | 2.6 | 3.1 | 3.0 | 2.9 |
| Mz/Mw | 1.7 | 1.7 | 2.4 | 2.1 |
| Density/kg·m$^{-3}$ | 941 | 953 | 940 | 950 |
| Penetration hardness/dmm | 3 | 1 | 3 | 1 |
| Acid value/KOH-mg/g | 1.1 | 1.2 | 1.0 | 0 |

The results of the solvent dispersion evaluation of Examples and Comparative Examples are shown in Table 2.

TABLE 2

Evaluation results of solvent dispersions

| Sample name | Examples | | Comparative Examples | |
|---|---|---|---|---|
| | Dispersion 1 | Dispersion 2 | Dispersion 3 | Dispersion 4 |
| Storage stability/mm | 1.0 | 2.0 | 2.0 | 8.0 |

The evaluation results of the printing ink of Examples and Comparative Examples are shown in Table 3.

TABLE 3

Evaluation results of printing inks

| Sample name | Examples | | Comparative Examples | |
|---|---|---|---|---|
| | Ink 1 | Ink 2 | Ink 3 | Ink 4 |
| Abrasion resistance | 3 | 4 | 2 | 3 |
| Blocking resistance | 3 | 4 | 2 | 4 |

INDUSTRIAL APPLICABILITY

An additive for a printing ink comprising a specific polyethylene-based wax of the present invention is stably dispersed in a non-aromatic solvent, and can simultaneously improve abrasion resistance and blocking resistance of the printing ink.

Furthermore, a solvent dispersion of the present invention is excellent in storage stability because the polyethylene-based wax is stably dispersed in the non-aromatic solvent, and can also improve simultaneously abrasion resistance and blocking resistance of the printing ink.

Accordingly, the additive and the solvent dispersion of the present invention can improve simultaneously abrasion resistance and blocking resistance of the printing ink, and also can respond to the recently increasing demand for using a non-aromatic solvent for a printing ink.

The invention claimed is:

1. A solvent dispersion for a printing ink, wherein a polyethylene-based wax that is produced with a metallocene-based catalyst and is subjected to oxidative modification, and specified by the following (i) to (vii):
   (i) being an ethylene homopolymer or a copolymer of ethylene and at least one α-olefin selected from α-olefins having 3 to 20 carbon atoms,
   (ii) having the intrinsic viscosity [η] determined in decalin at 135° C. ranging from 0.06 to 0.35 dl/g,
   (iii) having the ratio (Mw/Mn) of weight average molecular weight (Mw) to number average molecular weight (Mn) determined by gel permeation chromatography (GPC) ranging from 1.7 to 3.2,
   (iv) having the ratio (Mz/Mw) of z-average molecular weight (Mz) to weight average molecular weight (Mw) determined by gel permeation chromatography (GPC) ranging from 1.5 to 2.0,
   (v) having the density ranging from 920 to 980 kg/m$^3$,
   (vi) having the penetration hardness of 5 dmm or less, and
   (vii) having the acid value ranging from 0.3 to 9.9 KOH-mg/g, is dispersed in the form of fine particles having a volume average particle diameter ranging from 0.3 to 10 μm and at a ratio of 5 to 50 wt. % based on the total weight of the solvent dispersion in a non-aromatic solvent.

2. The solvent dispersion for a printing ink according to claim 1, wherein the non-aromatic solvent contains an alcohol-based solvent and/or an ester-based solvent at a ratio of 10 wt. % or more based on the total weight of the non-aromatic solvent.

3. A printing ink comprising the solvent dispersion according to claim 1, wherein the polyethylene-based wax is contained in the form of fine particles having a volume average particle diameter ranging from 0.3 to 10 μm and at a ratio of 0.1 to 10 wt. %, and the content of an aromatic solvent is less than 5 wt. % based on the total weight of the printing ink composition.

* * * * *